United States Patent Office 2,775,323
Patented Dec. 25, 1956

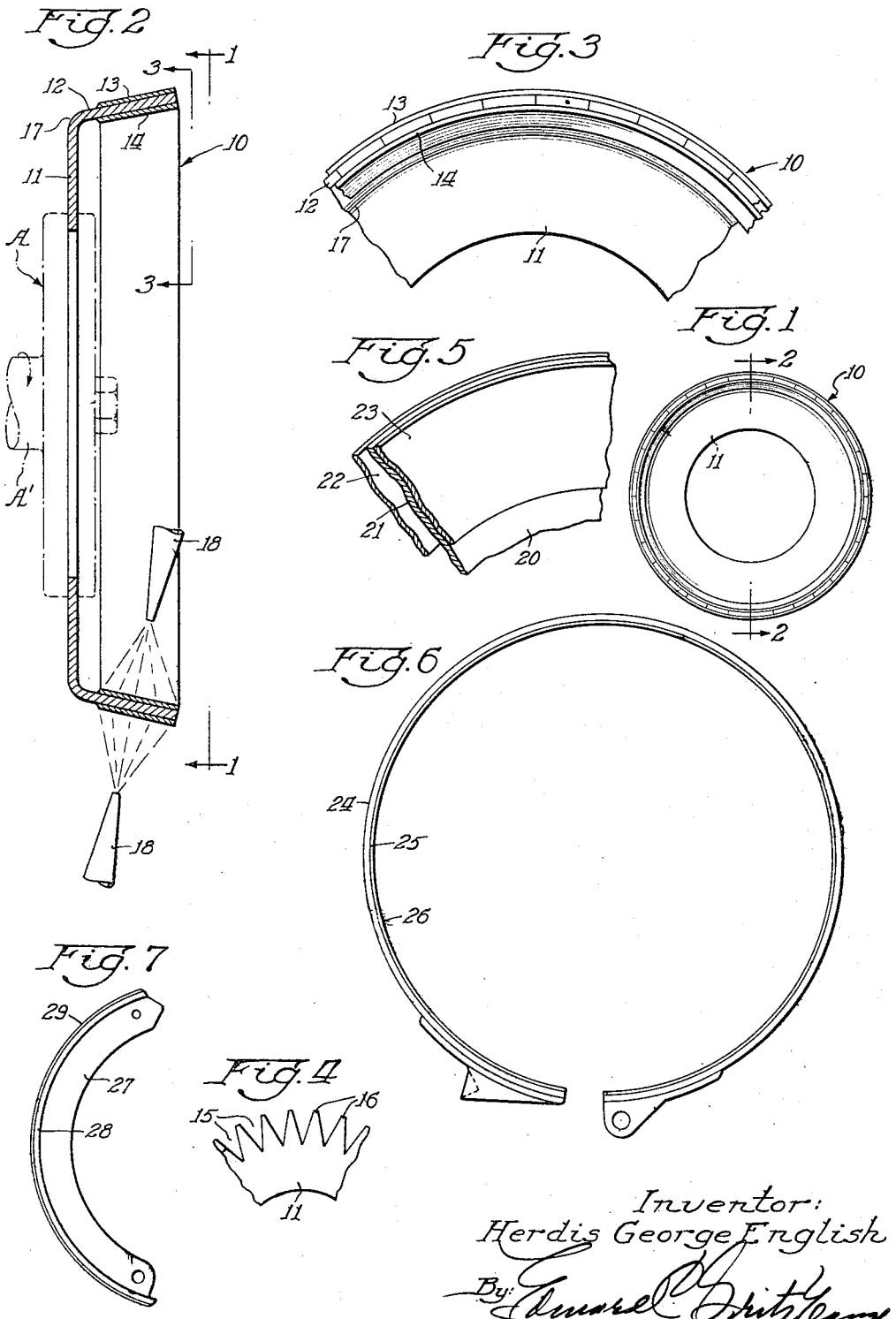

2,775,323

FRICTION ELEMENT AND METHOD OF MAKING THE SAME

Herdis G. English, La Grange, Ill., assignor to Borg-Warner Corporation, Chicago, Ill., a corporation of Illinois Application February 23, 1950, Serial No. 145,799

3 Claims. (Cl. 188—234)

This invention relates to friction elements and more particularly to improvements in a friction element utilizing metal friction facing material, such element being utilized as one of the relatively rotatable parts of a friction clutch or brake and being adapted to be engaged with the other relatively rotatable part of the clutch or brake.

Friction clutches or brakes conventionally comprise two relatively rotatable members, such as rotatable engageable driving and driven plates of a friction clutch, and engageable rotatable and stationary parts of a friction brake. The driven plate of the clutch or the stationary part of the brake are frequently provided with a fraction facing, which may be made of composition material, such as metallic fragment impregnated asbestos connected to a steel element of the clutch plate or the stationary brake part, or the friction facings are formed from powdered metals fused under tremendous pressures and very high temperatures to a supporting steel element.

Various disadvantages are encountered in both types of friction facings. Where separate friction facings of composition material are employed, the only satisfactory method yet found of attaching the facings to the clutch or brake elements is by means of rivets. Such rivets must be counter-sunk to dispose the same beneath the working face of the facing or facings in order to avoid engagement between the rivets and the driving plate of the clutch or the rotatable part of the brake to avoid searing and gouging of the latter clutch plate or rotatable brake part by the rivets. The portions of the friction facings that are available for frictional engagement are restricted to those portions projecting beyond the rivets. The remainder of the facings is utilized in gaining a purchase upon the heads of the rivets. As a result, the facings must be considerably thicker than they would have to be if they were completely consumed in the clutching or breaking operation. Furthermore, the rivets must carry nearly the entire load. A considerable number of them must be used, and they must be carefully set so that each one sustains its part of the load, and also to avoid buckling when the driven clutch plate and stationary brake part become heated in use. The sudden and severe strains also cause the rivets to become loose. Friction elements for clutches and brakes and having powdered metal facings comprise thin sections of metal providing facings fixed to a backing plate of steel, cast iron, or other metal, the thin friction facings being formed of sintered, powdered metals and bonded to the backing plate under pressures which may reach approximately 15 tons per square inch by a press in a reducing atmosphere, and at temperatures ranging from 1,250 to 1,650° Fahrenheit by specially designed furnaces, to insure a direct bond of the sintered powdered metal to the steel backing. This type of friction element provides higher heat conductivity as compared to friction facings of composition fiber material riveted to a backing member, as there is usually a considerably more rapid removal of the heat from the friction surfaces and, accordingly, bimetallic friction elements will have minimum temperatures on a contacting surface thereof. In addition, the opposing surface engaged by the friction element will have less tendency to heat check and will have a longer useful life. Furthermore, the bimetallic elements perform satisfactorily at temperatures and surface pressures greatly exceeding those of friction composition materials; they do not deteriorate in presence of oil or water; they will withstand severe shock loads; and they are not appreciatively affected by arctic cold, tropical heat, nor by variations in atmospheric humidity. While friction elements, having thin sections of sintered powdered metals forming their friction surfaces, thus have advantages over the friction facings of composition fiber materail riveted to a backing plate of other friction elements, it is necessary to have a considerable investment in pressure-providing machinery, such as presses, and also in specially designed furnaces for maintaining the proper atmosphere and temperatures during the pressure operation. Friction facings, having thermoplastic resin friction facings, also require similar presses and furnaces to effect a bonding of the thermoplastic resin friction facings to a steel plate.

It is an object of the present invention to provide a friction element having a ferrous metal backing plate and a metallic facing bonded thereto and a method of forming the friction element, which friction element will have all of the desirable features of friction elements having sintered powdered metallic facings without the necessity of employing expensive presses and furnaces required to produce an integral bond between the sintered powdered metal facing and the backing member requiring the maintenance of high unit pressures and critical high temperatures to effect a satisfactory bond.

The invention refers specifically to a friction element comprising a ferrous metal backing member having directly bonded thereto a metallic friction facing, and a method of manufacturing such friction element by spraying the ferrous metal backing plate with heated metal projected at relatively high velocity in a molten state upon the surface or surfaces of the metal backing plate to provide the friction facing or facings of the friction element.

The present invention is thus effective to provide a friction element and method of making the same contemplating a metallic friction facing being directly bonded to the backing plate of the friction element and integrally bonded thereto in a simple and inexpensive operation and, accordingly, at considerable savings in the cost of production of the friction elements over conventional manufacturing practices.

While a preferred embodiment of the invention is described herein, it is contemplated that considerable variation may be made in the method of forming and also the construction of friction element structures without departing from the spirit of the invention. The invention will be more clearly understood from the following description in conjunction with the accompanying drawings, in which:

Fig. 1 is a plan view of a cone clutch element embodying the invention, said view being taken on line 1—1 of Fig. 2;

Fig. 2 is a sectional view taken on line 2—2 of Fig. 1;

Fig. 3 is an enlarged view of a portion of the cone clutch element taken on line 3—3 of Fig. 2;

Fig. 4 is an enlarged view of a backing plate of the cone clutch element, such as that shown in Fig. 1, illustrating the plate at one of the manufacturing stages of the clutch element;

Fig. 5 is a perspective view of a fragmentary portion of a clutch plate embodying the invention;

Fig. 6 is a side elevation of a brake band embodying the invention; and

Fig. 7 is a side elevation of a brake shoe embodying the invention.

In the embodiment of the invention illustrated in Figs. 1 to 4, inclusive, there is shown a friction element of a cone type clutch, the element being identified generally by the numeral 10 and comprising an annular member in the form of an annular disked stamping having a radially flat portion 11 and a frusto-conical portion 12 connected at its small diameter to the outer periphery of the radially flat portion 11, the stampings being formed of ferrous metal and preferably steel to provide a backing support for metallic friction facings 13 and 14 bonded to radially inner and outer portions of the radially inner and outer surfaces of the frusto-conical portion 12.

Heretofore, the conventional practice in the art of making such friction elements of cone-type clutches is to provide friction facings of sintered metal involving the use of powdered metals bonded to a steel backing plate by the application of tremendous pressures to the powdered metals at very high temperatures to fuse the powdered metals to the steel plate, requiring the use of expensive presses and special furnaces for obtaining the desired bonding of the sintered powdered metals to the steel supporting plate. In such conventional practice and prior to the sintering operation, the steel backing plate, such as shown in Fig. 3, is in the form of a flat plate 11 and has a series of notches 15 cut in its outer periphery in such manner that, upon subsequent bending of the spokes 16, provided by the notches 15, the spokes can be bent radially toward the axis of the backing plate to provide the frusto-conical portion 12 of the backing member 11. Prior to this bending operation, the powdered metal is applied to the opposite sides of the spokes 16 and is bonded to the spokes 16 by the above-described operation. Application of the friction facings of powdered metal to the backing member 11 must be done in this manner, in view of the impracticability of supplying tremendous pressures by presses to a frusto-conical portion of a backing plate, it being believed to be clearly apparent that the application of considerable pressure can only be most facilely obtained when the plate is in its flat condition as shown in Fig. 4 when compared to the impractical application and delivery, by conical dies of a press, of such tremendous pressures to a frusto-conical portion of a disked stamping, such as the portion 12 of the element 10. Furthermore, considerable difficulty is realized thereafter, in the operation of forming the conical portion of the plate contemplating the spokes 16 being bent toward the axis of the plate to form the frusto-conical portion of the plate inasmuch as the strains imposed upon the metal of the backing plate, and more particularly at the junction of the spokes with the flat portion of the plate, will cause such strains to be translated to the spoke portion 16, i. e. the metal at the juncture of the spokes with the flat portion of the plate transfers the strains imposed on it to the metal forming the spokes, during the bending operation, so that the metal forming the spokes 16 will be stressed or strained, and, in turn, the sintered metal friction facings, bonded to the spokes, will have strains imposed on metal forming the facings, with the result that the sintered metal will be placed in tension and will crack and disintegrate.

The present invention is particularly advantageous in providing, as one of its features, a cone clutch element and method of making the same in a novel, practical and relatively simple manner without the described, disadvantageous conventional practice. More particularly, the invention contemplates the provision of metallic facings 13 and 14 on the cone portion 12 of a steel backing member of a friction element of a cone type clutch by utilizing a support member of steel or other ferrous material in the form of a flat plate having a plurality of notches 15 in the outer periphery thereof to provide spokes 16 and the formation of the cone portion 12 of the friction element 10 by the application of pressure to the spokes 16 to cause the spokes to be bent at their juncture 17 with the flat portion of the backing member to provide a frusto-conical portion 12. The bending operation causes the spokes 16 to be moved toward the axis of the backing member so that the radially inner and outer surfaces of the formed cone portion 12 of the backing member provide substantially uninterrupted annular faces. Application of the metallic friction facings to the conical surfaces of the portion 12 of the backing member is accomplished by spraying the inner and outer conical surfaces with a heated metal alloy or metal in an atomized or molten condition projected at relatively high velocity by atomizing nozzles 18 of spray guns containing a suitable supply of the molten metal and a reservoir for air under pressure.

It will be noted from an inspection of Fig. 2 that the plate 11 is secured to a fixture A having an axle A', with its axis concentric to the axis of the plate 11 for rotating the plate 11 during the application of the molten friction metal being sprayed on the surfaces of the cone portion 12 of the driven member 10 to provide a uniform depth of the friction material on the inner and outer diameters of the cone portion 12 of the member 11.

One preferred example of a satisfactory metal alloy having desired friction qualities is composed of:

| | Percent |
|---|---|
| Copper | 93.7 to 93.4 |
| Tin | 5.0 |
| Lead | 1.15 |
| Manganese | .10 |
| Zinc | .20 |
| Phosphorus | .12 |

The composition suggested is merely set forth for purposes of illustration, and it is not intended to convey the impression that the compositions are the only suitable metallic friction materials, since other metal compositions or single metals may be used. It is also contemplated that a metallic alloy of either of the compositions may be sprayed in molten state selectively on either the inner or outer diameters of the cone portion 12 of the backing member, or they may be sprayed simultaneously. It is also contemplated that the backing member 11 may be formed as a flat plate and then have its outer periphery bent, or otherwise formed by different metal working methods to provide a frusto-conical portion 12 forming a continuous band to provide radially inner and outer surfaces for the application of the metallic alloy friction facings thereto.

It will be readily apparent that the cone type clutch friction element manufactured by the improved method described is relatively simple and economical in comparison to the manufacture of the cone type friction elements having metallic friction surfaces provided by the sintering operation previously described, with my method having the additional advantageous factor that the equipment required for manufacturing the cone type friction element is relatively inexpensive when compared to the conventional practice of the substantial expenses involved by its necessity of providing presses capable of providing the tremendous pressures, and the employment of special furnaces to maintain the powdered metal at the extremely high temperatures, required to effect a bonding of sintered metal to a steel backing member as contemplated by the conventional sintering operation previously described.

Fig. 5 illustrates the fragmentary portion of a friction clutch plate comprising an annular disc 20 having an outer peripheral portion 21 between two metallic friction facings identified at 22 and 23, and which metallic friction facings are bonded to the peripheral portion 21 of the disc 20 by spraying a metal alloy, having the composition previously referred to, on the outer peripheral portion 21 of the steel disc 20 in a manner similar to that described with respect to the embodiment of the invention illustrated in Figs. 1 to 3, inclusive.

Fig. 6 illustrates a brake band comprising an annular steel member 24 having its radially inner face 25 provided with a metallic friction surface 26 applied to the face 25 in a manner previously described, it being contemplated that the molten metal alloy, of the composition previously described, be sprayed upon the inner face 25 of the band 24 by the nozzle 18 of a spray gun.

Fig. 7 illustrates a brake shoe comprising an arcuate stamping or casting, identified at 27, and having a T-section cross section with the cross bar 28 of the T-section providing a face 29 of arcuate formation and to which is bonded a metallic friction facing by the spraying of molten metal, of the composition previously described, by an atomizing nozzle, such as 18, in Fig. 2.

It will be understood that my invention is not necessarily limited to the production of a friction element of the specific kind or shape herein disclosed, nor for the use herein intended. My improved method is applicable to friction members or elements of any kind or class, and particularly those types of friction members disclosed. Various other changes in and modifications of the construction and method herein disclosed may be made within the scope of the appended claims without departing from the spirit of my invention or sacrificing any of the advantages accruing therefrom.

I claim:

1. The method of making a friction element which consists in providing a metallic disc; cutting a plurality of V-shaped notches in the periphery of the disc to provide a plurality of spoke-like members; bending the spoke-like members toward the axis of the disc and at one side of the plane of the disc to define a substantially uninterrupted frusto-conical peripheral portion of the disc; spraying the radially inner and outer surfaces of the frusto-conical portion of the disc with a metallic alloy having a high coefficient of friction and the characteristic of adhering when in a molten state to the metal of the frusto-conical portion of the disc and, upon cooling, to be integrally attached thereto; and cooling the sprayed alloy to provide friction facings adhering to the frusto-conical portion of the disc.

2. The method of making a friction element which consists in providing a metallic disc; cutting a plurality of V-shaped notches in the periphery of the disc to provide a plurality of spoke-like members; bending the spoke-like members toward the axis of the disc and at one side of the plane of the disc to define a substantially uninterrupted frusto-conical peripheral portion of the disc; spraying the radially inner and outer surfaces of the frusto-conical portion of the disc with a metallic alloy having the characteristic of having a higher coefficient of friction than the metal of the frusto-conical portion of the disc and of adhering when in a molten state to the metal of the frusto-conical portion of the disc and, upon cooling, to be integrally attached thereto; and cooling the sprayed alloy to provide friction facings adhering to the frusto-conical portion of the disc.

3. A friction element comprising a ferrous metallic supporting member comprising an integral flat portion and a frusto-conical portion joined at the small diameter thereof to the outer periphery of said flat portion; and a coating of friction material adhering to the metal of said frusto-conical portion after being sprayed thereon in molten condition in the form of a metal alloy comprised of 93.4% to 93.7% copper, 5% tin, 1.15% lead, 0.10% manganese, 0.20% zinc and 0.12% phosphorus.

References Cited in the file of this patent

UNITED STATES PATENTS

| | | |
|---|---|---|
| 1,281,108 | Vaughn | Oct. 8, 1918 |
| 1,947,894 | Whitworth | Feb. 20, 1934 |
| 1,955,156 | Udale | Apr. 17, 1934 |
| 2,005,922 | Stoekle | June 25, 1935 |
| 2,026,878 | Farr | Jan. 7, 1936 |
| 2,072,070 | Fisher | Feb. 23, 1937 |
| 2,112,697 | Van Halteren | Mar. 29, 1938 |
| 2,141,164 | Brehm | Dec. 27, 1938 |
| 2,187,348 | Hodson | Jan. 16, 1940 |
| 2,191,460 | Fisher | Feb. 27, 1940 |
| 2,217,001 | Bockius et al. | Oct. 8, 1940 |
| 2,272,532 | Shriver | Feb. 10, 1942 |
| 2,277,107 | Imes | Mar. 24, 1942 |
| 2,285,583 | Jennings et al. | June 9, 1942 |
| 2,314,902 | Shepard | Mar. 30, 1943 |
| 2,430,936 | Kraft | Nov. 18, 1947 |
| 2,464,437 | Dasher | Mar. 15, 1949 |
| 2,490,548 | Schultz | Dec. 6, 1949 |
| 2,559,747 | Batchelor et al. | July 10, 1951 |

FOREIGN PATENTS

| | | |
|---|---|---|
| 443,476 | Great Britain | Feb. 28, 1936 |